H. R. HUGHES.
DISK DRILL.
APPLICATION FILED FEB. 4, 1915.
1,204,157.
Patented Nov. 7, 1916.
2 SHEETS—SHEET 1.
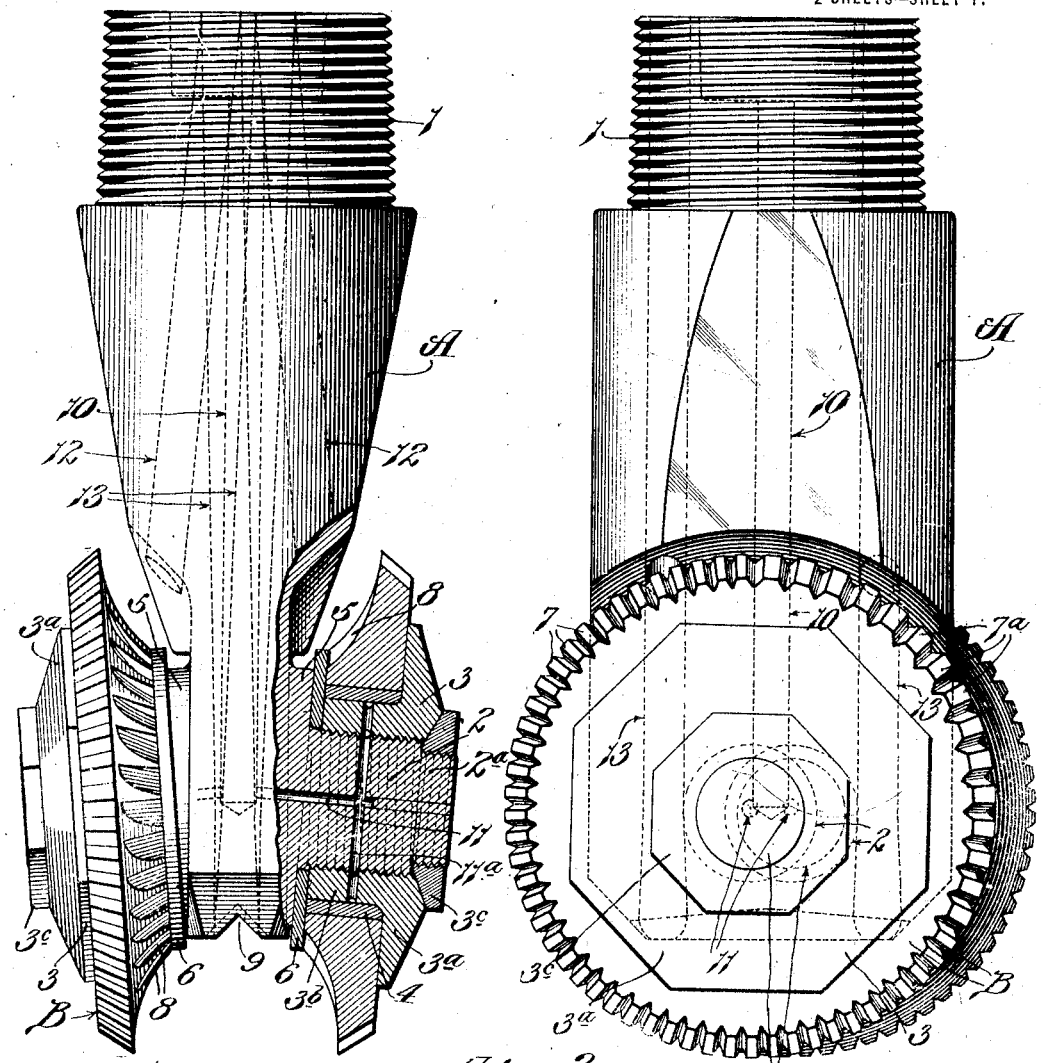
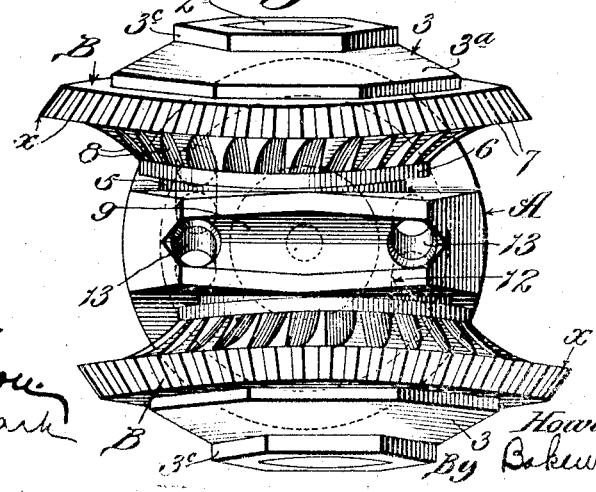

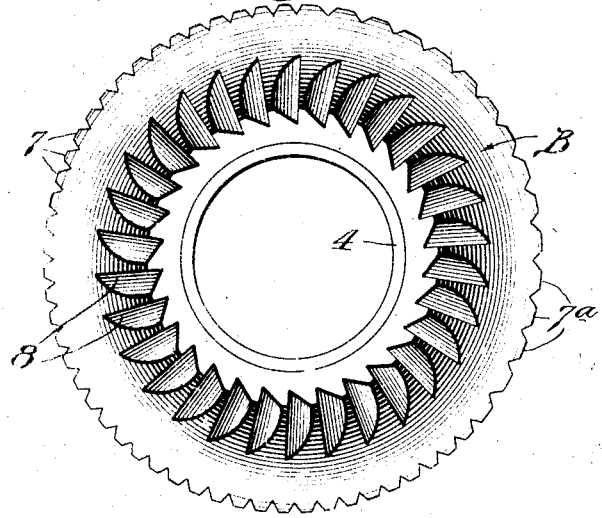
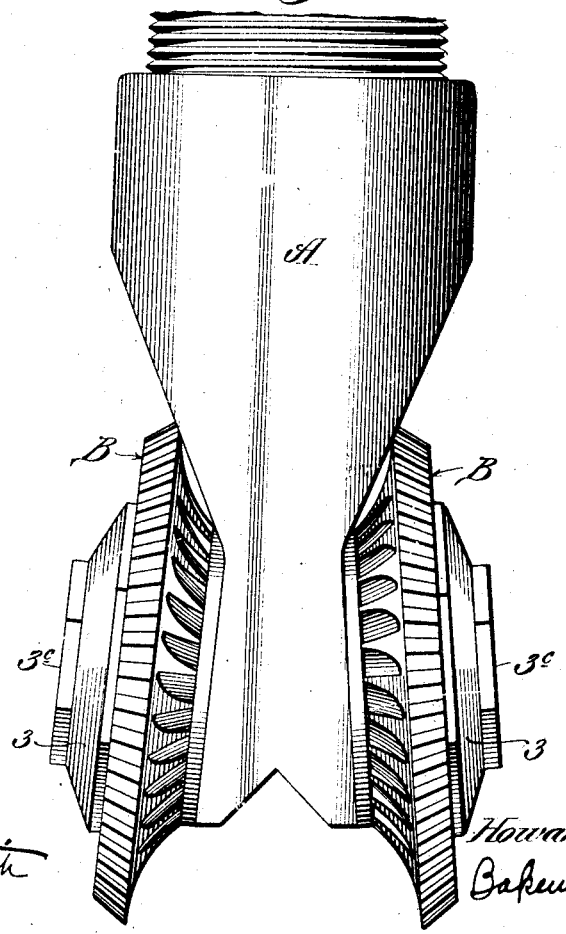

UNITED STATES PATENT OFFICE.

HOWARD R. HUGHES, OF HOUSTON, TEXAS, ASSIGNOR TO SHARP-HUGHES TOOL COMPANY, OF HOUSTON, TEXAS, A CORPORATION OF TEXAS.

DISK DRILL.

1,204,157.

Specification of Letters Patent.

Patented Nov. 7, 1916.

Application filed February 4, 1915. Serial No. 6,124.

*To all whom it may concern:*

Be it known that I, HOWARD R. HUGHES, a citizen of the United States, residing at Houston, Texas, have invented a certain new and useful Improvement in Disk Drills, of which the following is a full, clear, and exact description, such as will enable others skilled in the art to which it appertains to make and use the same.

This invention relates to rotary boring drills of the type that are commercially known as disk drills, and which are equipped with one or more substantially disk-shaped cutters that are rotatably mounted and arranged in an upright position on the head of the drill.

The main object of my present invention is to provide a practicable disk drill that is efficient, strong and inexpensive to manufacture and keep in serviceable condition.

Another object is to provide a disk drill in which the cutters or disks are provided on their inner sides with cutting surfaces of novel design that tend to break up the core at the center of the hole and also assist the disks to revolve on their axes, thereby preventing the cutting or shearing edges of the disks that act on the side wall of the hole from wearing flat, and thus causing the drill to lose its clearance.

Another object is to provide a disk drill whose cutters are provided on their edge portions with toothed cutting surfaces of novel design that eliminate any tendency of the disks to track, and thus not break up or crush the material at the bottom of the hole when the drill is in operation. And still another object of my invention is to provide a disk drill in which the water courses or passageways in the head of the drill are arranged in a novel manner that prevents disintegrated material from becoming packed around the cutters or around the head of the drill when the drill is operating in certain kinds of soft formations, such, for example, as shale, gumbo and conglomerate.

Other objects and desirable features of my invention will be hereinafter pointed out.

Figure 1 of the drawings is a front elevational view, partly in section, of a disk drill constructed in accordance with my invention. Fig. 2 is a side elevational view of said drill. Fig. 3 is a bottom plan view of the drill. Fig. 4 is a side elevational view, showing the inner side of one of the disk-shaped cutters with which the drill is provided, and Fig. 5 is a front elevational view, illustrating a slight modification of my invention.

Referring to the drawings, which illustrate the preferred form of my invention, A designates the head of the drill which is provided at its upper end with an externally screw-threaded portion 1 for enabling it to be connected to a hollow drill stem (not shown). Two substantially disk-shaped cutters B are arranged in an upright position on the head A adjacent the lower end of the head.

In the drill shown in Fig. 1 the cutters B are arranged at an angle with relation to the vertical axis of the drill, so that the lower portions of said cutters incline inwardly, and in the drill illustrated in Fig. 5 the cutters B' are inclined in the opposite direction, so that their lower portions incline outwardly or away from the vertical axis of the drill head. It is immaterial, however, so far as my broad idea is concerned, whether the cutters are arranged in the manner illustrated in Figs. 1 and 5, or in other ways, so long as they are disposed in a substantially upright position so that the advancing front edge portions of same will shear off the material at the side wall of the hole when the head A of the drill is rotated. The cutters B are arranged on the outside of the head and can be supported or connected to the head in various ways. I prefer, however, to provide the head A with integral, laterally-projecting spindles 2 that are externally screw-threaded so as to receive nuts 3 that retain the cutters B in operative position and also serve as bearings on which the cutters revolve, each of said nuts having an enlarged head or cap piece 3ª that bears against the outer side face of its coöperating cutter and a cylindrical-shaped bearing portion 3 on which said cutter is rotatably mounted. The nuts 3 are preferably formed of steel and the cutters B are provided with bushings 4 of bronze, or some other suitable material that has great wear-resisting properties. By forming the drill in this manner I obtain an exceptionally strong and rigid cutting tool that is capable of successfully withstanding excessive strains and hard usage without breaking, this, of course, being due to the fact that the cutters are mounted on integral spindles on the head of the drill and are retained in operative position by devices made of steel. The bronze bushings 4 operating on steel bearing members 3ᵇ provide excellent bearings for the cutters, which bearings are inexpensive to manufacture and maintain.

As shown in Fig. 1, the head A is provided adjacent the inner ends of the spindles 2 with integral end-thrust-resisting bearing surfaces 5 that take up the longitudinal thrusts that are exerted on the cutters B when the drill is in operation. I prefer to arrange washers 6 of bronze, or other suitable wear-resisting material, between the inner sides of the cutters B and the end-thrust bearings 5 on the head so as to prevent the head from becoming worn.

The cutters B are preferably offset slightly with relation to each other or arranged with their axes of rotation slightly staggered in a horizontal plane, as shown in Fig. 3, so as to prevent the rear edges of the cutters from dragging against the side wall of the hole, and thus wearing out rapidly when the advancing edges $x$ of said cutters are acting on the side wall of the hole. Each cutter B is preferably provided with a beveled edge that has cutting teeth 7 which extend transversely across same so as to form a toothed or serrated surface that will crush and pulverize the material at the bottom of the hole and also cause the cutter to revolve on its axis when the head A of the drill is rotated. In addition to the sharp shearing edges $x$ and the crushing surfaces 7, each cutter is provided on its inner side with a tapered portion that has saw teeth 8 formed in same, as shown more clearly in Fig. 4. When the drill is in operation these saw teeth 8 grab hold of the core at the center of the bottom of the hole, and thus break up the core and also assist the disks to turn or rotate on their axes, there being little tendency for the cutters B of the design above described to remain stationary or not revolve on their axes when the drill is rotating, owing to the exceptionally large serrated area on the inner side of the cutter and on the edge portion of same.

In order to eliminate the tendency of the cutters B to track, and thus not thoroughly break up the material at the bottom of the hole, I prefer to form the transverse teeth on the edge portion of each cutter of different pitch. In the drill herein shown each cutter is provided on its edge portion with teeth 7 of a comparatively fine pitch and also teeth 7ᵃ of a comparatively coarse pitch. A stationary cutting device is arranged at the lower end of the head A between the cutters B so as to help destroy the core left standing at the center of the hole, the stationary cutting device of the drill herein shown being formed by an inverted V-shaped groove 9 that extends transversely across the lower end face of the head between the cutters B, as shown in Fig. 3. When the drill is in operation the sharp edges of the groove 9 in the head act on the top surface or upper side of the core and the saw teeth 8 on the inner sides of the cutters act on the outer surface of the core, thereby causing the core to be completely broken up and pulverized.

A lubricating duct 10 is formed in the head, as shown in broken lines in Figs. 1 and 2, so as to conduct a lubricating medium from a lubricant holder (not shown), to distributing ducts 11 formed in the spindles 2, said lubricating ducts having branches 11ᵃ, as shown in Fig. 1, that lead to the bearing surfaces on which the cutters revolve. The head is equipped with the usual water courses or passage-ways for discharging jets of flushing water into the bottom of the hole, but the water courses or passage-ways of the drill herein shown are arranged in a novel manner that tends to prevent the disintegrated material from becoming packed tightly around the cutters and around the head of the drill when the drill is operating in clay, gumbo and various other soft formations.

In the drill herein shown the head A is provided with water courses 12 whose lower ends terminate adjacent the upper portions of the disks at the inner sides of same, as shown in full lines in Figs. 1 and 2, the water course 12 that coöperates with each cutter being preferably so disposed that the jet of water that escapes therefrom will be discharged downwardly and outwardly against the inner face of the cutter at the lead side of same. The head is also provided with independent water courses or passage-ways 13 that lead downwardly from the upper end of the head and terminate in the transverse groove 9 in the lower end face of the head. When the drill is in service the jets of water that are discharged from the water courses 12 keep the cutters clean and prevent the disintegrated material from becoming packed between the cutters and the head of the drill, and the jets of water that are discharged from the water courses 13 downwardly against the disintegrated material at the bottom of the hole prevent said material from packing in the groove 9 or in the space between the lower portions of the cutters.

I prefer to make the water passage-ways 13 of greater diameter at the extreme lower end of the head than at a point farther up in the head, or, in other words, taper the lower portions of the water passage-ways 13 so as to prevent the cuttings or disintegrated material from becoming wedged in said water passage-ways.

A disk drill of the construction above described is exceptionally strong and serviceable, it is inexpensive to manufacture and maintain in a serviceable condition, it has a high degree of efficiency and it is so designed that there is little liability of the cuttings or disintegrated material becoming packed around the head or around the cutters in such a manner that the cutters cannot turn on their axes when the drill is in operation. Consequently, such a drill is highly practicable for general use in all kinds of formations in which disk drills can be used successfully, and, as it is provided with exceptionally strong and rigid cutters and with adequate means for destroying a center core, it can be used successfully for drilling soft rock.

In order to eliminate the possibility of the nuts 3 unscrewing or working loose, as might occur in case the head of the drill rotates anti-clockwise during the operation of lowering the drill into a hole, I have provided each of the spindles 2 with a jam nut $3^c$ that is mounted on a reduced portion $2^a$ of the spindle which is threaded oppositely to the portion of the spindle on which the nut 3 is screwed, the nuts 3 of the drill herein shown having left-hand threads and the jam nuts $3^c$ having right-hand threads and also tapered inner sides or ends which are seated in tapered recesses formed in the outer ends of the nuts 3, as shown in Fig. 1.

Having thus described my invention, what I claim, and desire to secure by Letters Patent, is:

1. A disk drill, comprising a head, approximately disk-shaped cutters arranged in an upright position on the outer surface of said head and provided with cutting edges that act on the material on the side wall of the hole, and cutting surfaces on the inner sides of said cutters that act on the side of the core at the center of the hole and thus progressively destroy said core and assist said cutters to turn on their axes.

2. A disk drill, comprising a head, substantially disk-shaped cutters arranged in an upright position on the outer side of said head and provided with cutting edges that scrape off the material from the side wall of the hole when the head is rotated, said cutters being offset with relation to each other or arranged with their axes of rotation staggered slightly so that the rear edge portions of said cutters will not drag against the side wall of the hole, a stationary cutting device in the lower end face of the head arranged between said cutters and extending substantially parallel to same, and radially-disposed cutting edges on the inner sides of the cutters that disintegrate the material at the bottom of the hole and also assist the cutters to turn on their axes.

3. A disk drill, comprising a head, substantially disk-shaped cutters arranged in an upright position on the outer side of said head and provided on their edge portions with teeth, radially disposed cutting teeth on the inner sides of said cutters, and a stationary cutting device in the lower end face of the head arranged between said cutters and extending substantially parallel to same.

4. A disk drill, comprising a head provided adjacent its lower end with integral, laterally projecting spindles that are offset or staggered slightly with relation to each other, substantially disk-shaped cutters rotatably mounted on said spindles and provided with cutting edges that shear off the material from the side wall of the hole when the head is rotated, radially-disposed cutting edges on the inner sides of said cutters that disintegrate the material at the bottom of the hole, and a recess formed at the lower end face of the head and extending parallel to said cutters for disintegrating the material at the center of the bottom of the hole.

5. A disk drill, comprising a head, approximately disk-shaped cutters arranged in an upright position on the outside of said head, and means for discharging jets of flushing water downwardly from the lower end face of the head between said cutters, at points below the axes of said cutters and also downwardly against the inner sides of said cutters at points above the axes on which they revolve.

6. In a disk drill, the combination of a head, rotatable cutters arranged in an upright position on the outer side of the head, means for discharging jets of flushing water laterally from the head against the inner sides of said cutters, and independent means for discharging jets of flushing water downwardly from the lower end face of the head at points between said cutters and below the axes about which they revolve.

7. A disk drill, comprising a head, rotatable cutters arranged in an upright position on said head and provided with cutting edges that scrape off the material at the side wall of the hole, said cutters being provided on their inner sides with radially disposed cutting edges that act on the side of the core at the center of the hole, and means for discharging jets of flushing water against the inner sides of the cutters so as to keep said cutting edges clean.

8. A cutter for a rotary boring drill consisting of a substantially disk-shaped member that is adapted to be arranged in an upright position at one side of the vertical axis of the drill, said cutter being provided on its inner side with saw teeth that act on the side of the core left standing at the center of the hole so as to destroy said core and also assist the cutter to turn on its axis.

9. A rotary cutter for boring drills, consisting of a substantially disk-shaped member adapted to be arranged in an upright position at one side of the vertical axis of the drill and provided on its edge portion with cutting teeth and on one of its side faces with substantially saw-shaped cutting teeth that radiate from the axis of the cutter and which act on the side of the core at the center of the hole.

10. A rotary cutter for boring drills, consisting of a substantially disk-shaped member that is adapted to be arranged in a substantially upright position at one side of the vertical axis of the head of the drill, said member having a beveled edge that is provided with transverse cutting teeth, and a tapered portion on the inner side of said member that is equipped with saw-shaped cutting teeth that radiate from the center of the cutter and which act on the side of the core at the center of the hole.

11. A disk drill provided with a rotatable cutter of substantially disk-form that is arranged in an upright position on the head of the drill, said cutter being provided on its edge portion with cutting teeth, some of which have a different pitch than the remaining teeth.

12. A disk drill provided with a rotatable cutter of substantially disk form that is arranged in an upright position on the head of the drill at one side of the vertical axis of the head, said cutter being provided on its edge portion with cutting teeth, some of which have a different pitch than the remaining teeth, and approximately radially-disposed teeth on the inner side of said cutter.

13. A disk drill provided with a rotatable cutter of substantially disk form that is arranged in an upright position on the head of the drill at one side of the vertical axis of the head, said cutter being provided on its edge portion with cutting teeth, some of which have a different pitch than the remaining teeth, and saw teeth on the inner side of said cutter.

14. A rotatable cutter for boring drills consisting of a substantially disk-shaped member that is adapted to be arranged in an upright position on the head of the drill at one side of the vertical axis of the head, said member having a beveled edge provided with transverse teeth, some of which have a different pitch than others, and saw teeth on the inner side of said member that are presented toward the head of the drill.

15. A disk drill, comprising a head provided in its lower end face with an inverted V-shaped notch that extends transversely across the head, rotatable cutters arranged in an upright position on the head on opposite sides of said notch, said cutters being offset with relation to each other, water courses in the head whose lower ends terminate in said notch, and independent water courses in the head from which jets of flushing water are discharged to dislodge the material that tends to adhere to the inner sides of the cutters.

16. A disk drill, comprising a head, rotatable cutters arranged in an upright position on said head, a groove formed in the lower end of the head below the axes of said cutters and having cutting edges that extend parallel to said cutters and a water course in the head that extends downwardly through same and terminates in the bottom of said groove, the lower end of said water course being tapered for the purpose described.

In testimony whereof I hereunto affix my signature in the presence of two witnesses, this twenty-eighth day of January 1915.

HOWARD R. HUGHES.

Witnesses:
FRANK C. CLEMENS,
NADINE LE GROS.